US 8,145,949 B2

(12) United States Patent
Silver

(10) Patent No.: US 8,145,949 B2
(45) Date of Patent: Mar. 27, 2012

(54) AUTOMATED REGRESSION FAILURE MANAGEMENT SYSTEM

(75) Inventor: Jordan Silver, Saratoga, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 30 days.

(21) Appl. No.: 12/816,573

(22) Filed: Jun. 16, 2010

(65) Prior Publication Data

US 2011/0314334 A1 Dec. 22, 2011

(51) Int. Cl.
*G06F 11/00* (2006.01)
(52) U.S. Cl. ............. 714/26; 714/25; 714/37; 714/38.1; 716/106; 716/136
(58) Field of Classification Search .............. 714/25, 714/26, 37, 38.1; 716/106, 136
See application file for complete search history.

(56) References Cited

U.S. PATENT DOCUMENTS

| | | | | | |
|---|---|---|---|---|---|
| 5,703,788 | A * | 12/1997 | Shei et al. | | 716/102 |
| 5,926,622 | A * | 7/1999 | Hardin et al. | | 714/33 |
| 6,185,726 | B1 * | 2/2001 | Chou | | 716/104 |
| 6,212,667 | B1 * | 4/2001 | Geer et al. | | 716/136 |
| 6,496,792 | B1 * | 12/2002 | Magnusson | | 703/27 |
| 6,523,151 | B2 * | 2/2003 | Hekmatpour | | 716/106 |
| 6,735,747 | B2 * | 5/2004 | Watkins | | 716/106 |
| 6,748,584 | B1 * | 6/2004 | Witchel et al. | | 717/136 |
| 6,934,656 | B2 * | 8/2005 | Norman et al. | | 702/117 |
| 7,320,090 | B2 * | 1/2008 | Coulter et al. | | 714/30 |
| 7,464,363 | B2 * | 12/2008 | Sasaki et al. | | 716/138 |
| 7,836,416 | B2 * | 11/2010 | Schubert et al. | | 716/106 |
| 7,844,955 | B2 * | 11/2010 | Tateishi et al. | | 717/131 |
| 7,958,395 | B2 * | 6/2011 | Gygi et al. | | 714/25 |
| 2002/0002698 | A1 * | 1/2002 | Hekmatpour | | 716/4 |
| 2004/0154001 | A1 * | 8/2004 | Haghighat et al. | | 717/130 |
| 2005/0027485 | A1 * | 2/2005 | Zetko-White | | 702/185 |
| 2005/0154939 | A1 * | 7/2005 | De Pauw et al. | | 714/25 |
| 2005/0278576 | A1 * | 12/2005 | Hekmatpour | | 714/37 |
| 2006/0277510 | A1 * | 12/2006 | Sasaki et al. | | 716/5 |
| 2007/0198959 | A1 * | 8/2007 | Schubert et al. | | 716/4 |
| 2008/0065931 | A1 * | 3/2008 | Coulter et al. | | 714/37 |
| 2008/0072196 | A1 * | 3/2008 | Hekmatpour et al. | | 716/5 |
| 2008/0126867 | A1 * | 5/2008 | Pandarinathan et al. | | 714/37 |
| 2008/0209276 | A1 * | 8/2008 | Stubbs et al. | | 714/38 |
| 2008/0222149 | A1 * | 9/2008 | Li et al. | | 707/7 |
| 2008/0256393 | A1 * | 10/2008 | Ur | | 714/38 |
| 2008/0288903 | A1 * | 11/2008 | Chadha | | 716/5 |
| 2008/0307263 | A1 * | 12/2008 | Coulter et al. | | 714/37 |
| 2009/0150839 | A1 * | 6/2009 | Huang et al. | | 716/5 |
| 2009/0320002 | A1 * | 12/2009 | Peri-Glass et al. | | 717/131 |
| 2010/0017787 | A1 * | 1/2010 | Bellucci et al. | | 717/111 |
| 2010/0070940 | A1 * | 3/2010 | Bist et al. | | 716/5 |

\* cited by examiner

*Primary Examiner* — Robert Beausoliel, Jr.
*Assistant Examiner* — Joshua P Lottich
(74) *Attorney, Agent, or Firm* — Beyer Law Group LLP

(57) ABSTRACT

In a first embodiment of the present invention, a method for performing regression testing on a simulated hardware is provided, the method comprising: scanning a defect database for fixed signatures; retrieving all tests in a failing instance database that correspond to the fixed signatures from the defect database; running one or more of the retrieved tests; determining if any of the retrieved tests failed during running; and for any retrieved test that failed during running, refiling the failed retrieved tests in the failing instance database and placing one or more generalized signatures for the failed retrieved tests in the defect database.

19 Claims, 2 Drawing Sheets

AUTOMATED REGRESSION FAILURE MANAGEMENT SYSTEM

BACKGROUND OF THE INVENTION

1. Field of the Invention

The present invention relates generally to computer device testing. More specifically, the present invention relates to a system for automated regression failure management.

2. Description of the Related Art

Creating computer chips involves a number of facets before the fabrication of the physical device itself. Typically, software code is written that identifies the various components of the integrated circuit. This software code will eventually be used to create the actual chip itself, but utilizing the software beforehand allows the designer to run various simulations to determine the proposed design's efficiency and effectiveness.

During these simulations, various inputs are tested and then outputs are measured to ensure that the outputs match what is expected given the corresponding inputs. Any discrepancy may reveal an error in the design, necessitating attention from the designer, who may fix the error, or even completely redesign the chip, due to the results of the simulations.

These simulations are operated using a simulation environment in which various tests may be created, and then these tests can be applied to the proposed design. One common type of testing is known as regression testing. In regression testing, when an error is found and (believed to be) fixed, the modified program is partially rerun to ensure that no additional errors were introduced in the process of fixing the original problem(s). Modern regression software environments automate this process, allowing the test suite to automatically rerun all necessary regression tests.

The intent of the testing is to provide some reassurance that the product is behaving as expected, that modifications to a product for the purposes of fixing a defect have indeed fixed that defect, and that those modifications have had no unwanted effects on other functionality or behaviors of the product.

It is common also to introduce randomness into the test suite, to more accurately represent real-world behavior, which can often be unpredictable, and to prevent the preconceived notions of the person running the test suite from unduly limiting the types of test inputs provided. While this is the desired behavior, it represents a unique constraint in reproducing the particular stimulus that generated a behavioral failure in the product, since successive regressions will not necessarily stimulate the same behaviors or cover the same functionality in the product. This can be solved by capturing the particular random seed of a failing test and then re-running that test again at a later time using the captured seed, in an attempt to reproduce the exact same stimulus that exposed a failing behavior.

It is quite common for many thousands of test simulations to be performed on a single piece of software daily. Through this testing, it can also take many regression runs to adequately simulate all of the required behavioral functionality of the product. Any failure in any instance of a test requires a human to analyze the results of that test and investigate possible root causes of the failure.

Due to the large number of failures that can be detected over the course of these multiple regression runs, it can be too much for a product development team to efficiently investigate all of the errors in a reasonable amount of time. To aid with this, some abstractions can be made. These abstractions typically take the form of programmatically parsing the failure result and creating a defect signature. A single defect signature can then represent some larger number of individual failing test instances. Although this may not be precise, it enables the development team to efficiently investigate the most likely causes of the errors.

Each failure signature is entered into a defect tracking database and a status is kept on that signature as the development process (investigate, analyze, fix, resolve to closure) is followed.

Thus, for example, a test input may include various command lines including an address, a command, and data. This means that the test should run the command at the address using the data specified. It may be that the data is 16 bits, so there are $2^{16}$ possible data combinations that are tested. However, in many cases, if the command is going to produce an error, it will do so regardless of the exact data provided. As such, a single failure signature identifying the command and the address is maintained, rather than maintaining a signature for each of the $2^{16}$ possible data combinations. This signature is generated by parsing a log file containing the results of the tests, and pulling out these signatures into a defect database.

There are a number of issues, however, presented by these methods. There are too many test instance failures to investigate and analyze efficiently, necessitating abstraction of multiple failing test instances into a single defect signature, losing potentially valuable test information. Additionally, because of the abstraction of the failure data, it is difficult to determine whether any one particular fix or a single signature is actually applicable to all of the abstracted failures for that signature. Finally, because of the randomness of a regression test suite, the re-production of the stimulus that reveals any particular failure may never recur.

SUMMARY OF THE INVENTION

In a first embodiment of the present invention, a method for performing regression testing on a simulated hardware is provided, the method comprising: scanning a defect database for fixed signatures; retrieving all tests in a failing instance database that correspond to the fixed signatures from the defect database; running one or more of the retrieved tests; determining if any of the retrieved tests failed during running; and for any retrieved test that failed during running, refiling the failed retrieved tests in the failing instance database and placing one or more generalized signatures for the failed retrieved tests in the defect database.

In a second embodiment of the present invention, a regression test suite is provided including: a defect database containing generalized signatures of failed tests; a failing instance database containing an entry for each unique failed test; a defect database scanner coupled to the defect database and configured to scan the defect database for fixed signatures; a failing instance runner coupled to the defect database scanner and to the failing instance database and configured to retrieve all tests in the failing instance database that correspond to the fixed signatures from the defect database, and run one or more of the retrieved tests; and a failed test refiler coupled to the failing instance runner, the defect database, and the failing instance database and configured to determine if any of the retrieved tests failed during running, and, for any retrieved test that failed during running, refile the failed retrieved tests in the failing instance database and place one or more generalized signatures for the failed retrieved tests in the defect database.

In a third embodiment of the present invention, an apparatus for performing regression testing on a simulated hardware is provided, the apparatus comprising: means for scanning a defect database for fixed signatures; means for retrieving all tests in a failing instance database that correspond to the fixed signatures from the defect database; means for running one or more of the retrieved tests; means for determining if any of the retrieved tests failed during running; and means for, for any retrieved test that failed during running, refiling the failed retrieved tests in the failing instance database and placing one or more generalized signatures for the failed retrieved tests in the defect database.

In a fourth embodiment of the present invention, a program storage device readable by a machine tangibly embodying a program of instructions executable by the machine to perform a method for performing regression testing on a simulated hardware is provided, the method comprising: scanning a defect database for fixed signatures; retrieving all tests in a failing instance database that correspond to the fixed signatures from the defect database; running one or more of the retrieved tests; determining if any of the retrieved tests failed during running; and for any retrieved test that failed during running, refiling the failed retrieved tests in the failing instance database and placing one or more generalized signatures for the failed retrieved tests in the defect database.

DETAILED DESCRIPTION OF SPECIFIC EMBODIMENTS

Figure 1:
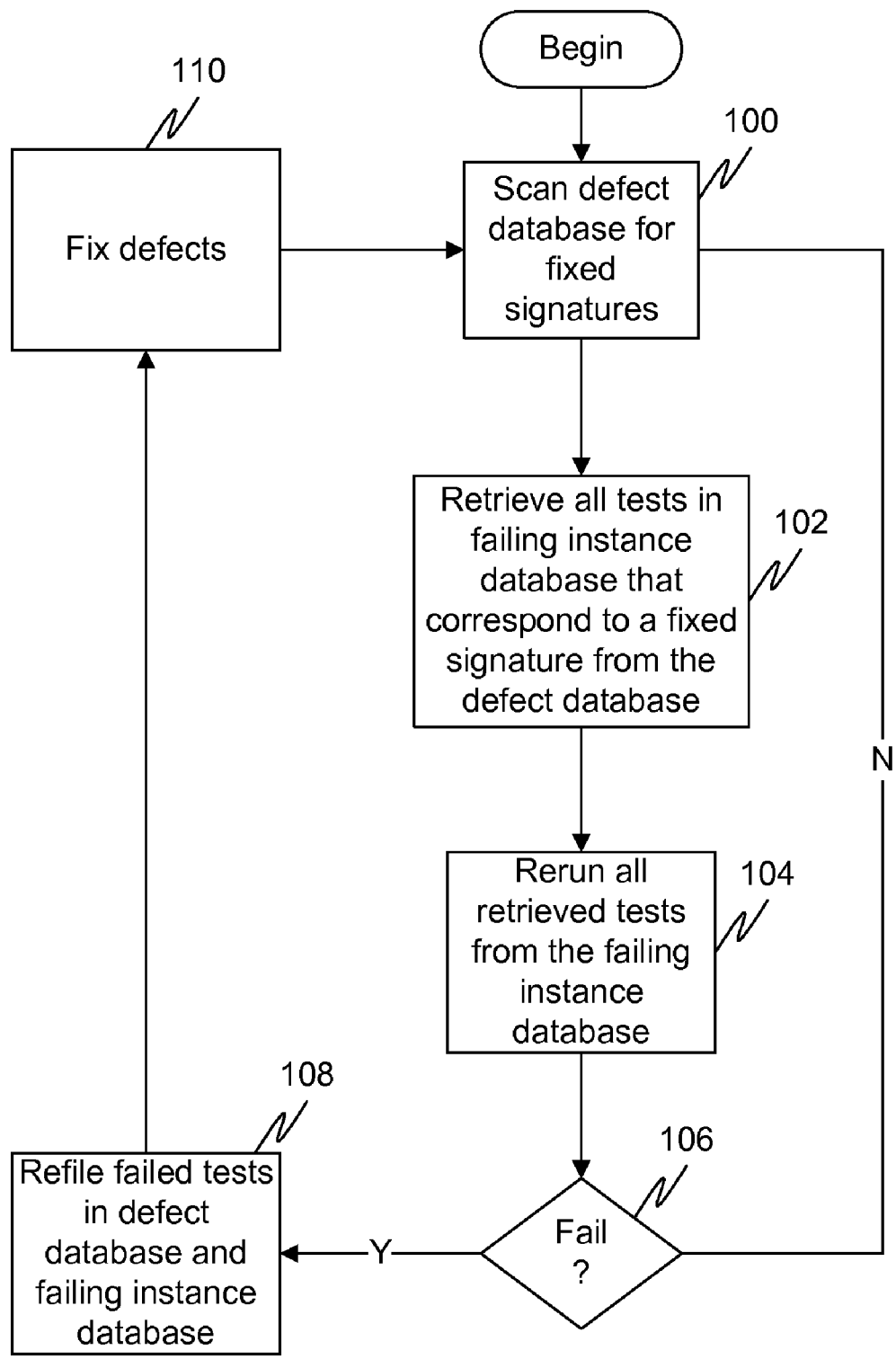
FIG. 1 is a flow diagram illustrating a method for performing regression testing of simulated hardware in accordance with an embodiment of the present invention.

Reference will now be made in detail to specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, two databases are maintained. In addition to maintaining a typical defect database containing generalized signatures of failures, a failing instance database is maintained that contains a unique signature of each and every failure, in addition to the complete description of the actual failing command. This unique signature in the failing instance database may include a seed value for each of the tests, to track the randomized values provided as input to the test, and allow for replication of the error during debugging.

During the regression testing, once a particular failure is "closed" (meaning that the debugger is believed to have addressed the underlying error), the corresponding signature is closed in the defect database. This signature is then taken from the defect database and used to determine a series of matching tests in the failing instance database. Only the tests in the failing instance database corresponding to that (closed) signature are then rerun during the regression testing. If no error occurs, those tests may be closed in the failing instance database. If an error occurs, however, the signature is placed back into the defect database. In this manner, it is not necessary to run all the individual failure tests in the failing instance database, only the subset of the tests that correspond to the closed signature from the defect database need to be rerun.

In one embodiment of the present invention, the information kept in the failing instance database includes a command line that was used to run the test. Oftentimes this command line (which was extracted from the instance database and is now presented to the operating system of the computer) will specify which test to run along with various parameters that are used by the test to modify its generated sequence of random device under test (DUT) commands, data, and addresses. However, embodiments are foreseen wherein the command line includes additional information. Furthermore, embodiments are foreseen wherein additional information not included in the original command lines is included as well. However, one of the main advantages of the failing instance database is that each entry contains less information than an entry in the defect database, permitting efficient storage of a significant number of individual tests. Thus, it will be desirable to ensure that the amount of information stored in each entry of the failing instance database does not grow so large as to negate this advantage.

FIG. 1 is a flow diagram illustrating a method for performing regression testing of simulated hardware in accordance with an embodiment of the present invention. At 100, a defect database is scanned for fixed signatures. The defect database includes signatures of tests that were run and failed, but once an issue is fixed a designer/tester updates the database to reflect that the corresponding signature has been fixed. This scanning can be performed in a number of different manners. In one embodiment, the scanning is performed periodically (e.g., four times a day). In another embodiment, the scanning is performed dynamically (e.g., whenever a signature is labeled as "fixed", the scanning occurs automatically). In another embodiment of the present invention, the scanning is performed at randomized intervals. In another embodiment of the present invention, the scanning is performed only upon instruction (i.e., manually rather than automatically).

It should also be noted that the phrase "scanning the defect database for fixed signatures" shall be construed to include embodiments where a fixed defect is actually removed from the defect database when the designer/tester believes he or she has fixed the issue. In such instances, the scanning of the defect database may include comparing the scanned database to a previous version of the defect database to see which entries have been recently removed. In another embodiment of the present invention, a fixed signature may simply be labeled as "fixed" in the defect database until it is removed at a later time.

At 102, once the fixed signatures have been identified, all tests in the failing instance database that correspond to a fixed signature from the defect database are retrieved. In one embodiment of the present invention, retrieval means removing the corresponding tests from the failing instance database. At 104, all the retrieved tests from the failing instance database are rerun. It should be noted that other embodiments are possible where fewer than all the retrieved tests are rerun. For example, in systems where resources (e.g., CPU cycles) are scarce, it may be desirable to merely rerun a subset of the retrieved tests (e.g., the first 50). Of course, this does not provide as reliable results as rerunning all of the retrieved tests, but a risk/benefit analysis can be undertaken to aid in the decision.

At 106, it is determined if any of the retrieved tests failed during running. If not, then the process can simply return to 100 to continue to scan for newly fixed signatures in the defect database (or simply end, in the case where the scanning is not performed dynamically). If any of the retrieved tests failed during running, however, then at 108 the failed tests can be refiled in the defect database and the failing instance database. This may include, for the defect database, created generalized signature(s) for the failed test and placing these signatures in the defect database. For the failing instance database, this may include placing the command lines for each of the failed tests into the failing instance database.

In addition to the optional embodiment described above, there are a number of additional alternative embodiments of the present invention. In one embodiment, in order to provide further coverage of potential errors, rather than merely rerunning all the failed tests in the failing instance database using the original random seeds, a threshold may be used to rerun the failed tests using seeds close to the original random seeds as well. For example, the tests may be rerun using seeds that are plus or minus 10 from the original random seed.

A similar type of expanded coverage can also be performed using the address listed in each test. Extra tests may be added to addresses within a threshold of the original address. This allows locations similar to the originally tested location to be tested under similar circumstances as the originally tested location, aiding to find errors in similar locations that are likely to occur since similar locations often fail under similar testing conditions. These embodiments allow the system to be proactive with respect to testing, anticipating where errors may occur even before those areas have been tested or the particular input seeds have been used.

Example 1, provided below, is an example of a defect database. This is merely an example of a defect database, and one of ordinary skill in the art will recognize that there are many different ways to implement this database. It should also be noted that due to space limitations, only one entry is shown in the defect database below. However, in practice, the defect database could be filled with many such entries.

The sequence of inputs and outputs of each test can be captured in a log. The log then can be parsed for a failure and the failure can be added into the defect database. For example, assume that multiple regressions were run and three separate instances of a failing signature "PL_____; Reached timeout of _____ cycles and DUT should send a SKIP OS by now" were encountered. One failure may have been on Dec. 14, 2009, once on Dec. 6, 2009, and once on Dec. 22, 2009. As can be seen in the above example defect database, the signature is entered only once, as defect number 2759. The cycle in which the timeout was detected was deprecated (108632.00), as was the PHY-LAYER (PL) module number of the design (PL__0__0) and the number of timeout cycles (3076) to create the signature.

Additionally, three separate failing instances are inserted into the failing instance database. An example failing instance database is shown below as example 2. This is merely an example of a failing instance database, and one of ordinary skill in the art will recognize that there are many different ways to implement this database.

The defect-number is recorded, as well as the defect-command and the defect-random-seed. The defect-number is what is used to match against a closed or fixed defect in the defect database. For example, when the defect database defect number 2759 is closed, all entries in the failing instance database corresponding to 2759 (in this example, there are three) are pulled out and re-run against the design using the specified defect-command and defect-random-seed for each test. It can be seen that these tests are not the same. The first instance specifies that—switch_mode 2 should be used while the second instance does not. The third instance specifies that a dead-time_limit of 400000 should be used. All of these could result in significantly different outcomes of the test, as could the different random seed numbers.

Figure 2:
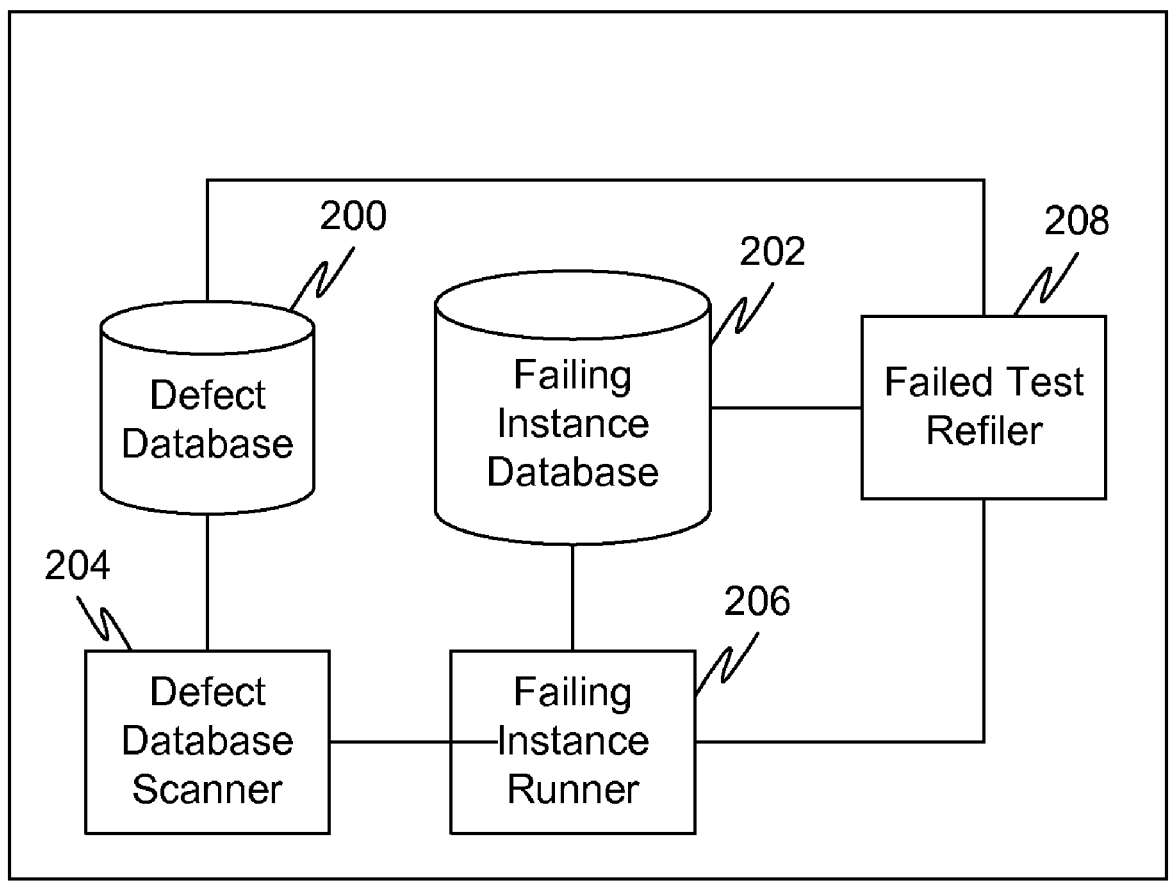
FIG. 2 is a diagram illustrating a regression test suite in accordance with an embodiment of the present invention.

FIG. 2 is a diagram illustrating a regression test suite in accordance with an embodiment of the present invention. A defect database 200 includes generalized signatures of failed tests, while a failing instance database 202 contains an entry for each unique failed test. A defect database scanner 204 may be configured to scan the defect database for fixed signatures. A failing instance runner 206 may be configured to retrieve all tests in the failing instance database that correspond to the fixed signatures from the defect database, and run one or more of the retrieved tests. A failed test refiler 208 may be configured to determine if any of the retrieved tests failed during running and, for any retrieved test that failed during running, refile the failed retrieved tests in the failing instance database and place one or more generalized signatures for the failed retrieved tests in the defect database.

It should be noted that while the foregoing disclosure discussed the defect database and the failing instance database as separate databases, embodiments are foreseen wherein all the information from either of these databases is stored as a single database. This single database may either be a single physical database, shared by two distinct logical databases, or may be embodied as a single logical database with divisions/partitions for the defect database and failing instance database. One of ordinary skill in the art will also recognize that the database(s) can be distributed across multiple physical databases, either all located locally or distributed some distance from each other geographically.

It should also be noted that, while not pictured in FIG. 2, the regression test suite may operate on a computing device utilizing one or more processors to perform the various steps and operate the various modules of the test suite. An example computing device is a server or a series of servers operated as a cluster in order to improve efficiency and processing power for the system as a whole.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over networkcoupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

EXAMPLE 1

```
<defect>
    <record-id>2759</record-id>
    <defect-number>2759</defect-number>
    <summary>[108632.00] PL_0_0: ERROR: Reached timeout of 3076 cycles and DUT should send a SKIP OS by now</summary>
    <entered-by><last-name>Defect</last-name><first-name>Auto</first-name><middle-name></middle-name></entered-by>
    <date-entered>12/4/2009</date-entered>
    <type>Full Chip Simulation</type>
    <product>Draco</product>
    <disposition>RTL</disposition>
    <priority>Normal</priority>
    <component>PHY</component>
    <severity>Affects Customer</severity>
    <reported-by-record>
        <found-by><last-name>Defect</last-name><first-name>Auto</first-name><middle-name></middle-name></found-by>
        <version-found>AA</version-found>
        <description>Chris,
This is a really basic Hot Reset test. At around time 100302ns, Port 0 already link back up after the Hot Reset but for some reason DUT enter Eidle out of no where. BFM not expecting it.</description>
        <steps-to-reproduce>HERE ARE THE STEPS TO REPRODUCE THIS PROBLEM:
gzip -cd /net/proj/ENGPOOL2/defect/defect13143.tar.gz | tar xf -
cd defect13143/verif/niva/draco/vcore/log
umask 002
./run.defect -buildclean
HERE ARE THE SHORTCUT STEPS TO REPRODUCE THIS PROBLEM:
cd /net/proj/ENGPOOL2/debug/defect13143/verif/niva/draco/vcore/log
umask 002
./run.defect -buildclean
run_make -f ../../vcore/code/draco_vcore.vlist ../../vcore/test/test_program.vr
+testcase=t_direct_hotreset -config ../../vcore/config/zero_tolerance.cfg -port_configuration random -phy_broken_lane 0 -pmt_enable 0 -time_limit 120000 -switch_mode 2 -owner gilbert -debug_on PL -phy_trace_log 1 -fsdb +dump_start=50000 -seed 1125376505 -buildclean
--------------------------------------------------------
use tree = gzip -cd /net/proj/DRACO/defect/PEX09120318.tar.gz | tar xvf -
cd PEX09120318/verif/niva/draco/vcore/regress
umask 002
../../../../../vbin/run_make -f ../../vcore/code/draco_vcore.vlist ../../vcore/test/test_program.vr
+testcase=t_direct_hotreset -config ../../vcore/config/zero_tolerance.cfg -port_configuration random -phy_broken_lane 0 -pmt_enable 0 -time_limit 120000 -switch_mode 2 -owner gilbert -note_off . -seed 1125376505 -buildclean
path to logfile =
/net/proj/REGRESS/regression/gen3_jobs/PEX09120318/log.1125376505</steps-to-reproduce>
        <computer-config type="users"></computer-config>
    </reported-by-record>
    <defect-event>
        <event-name>Assign</event-name>
        <event-date>12/4/2009</event-date>
        <event-author><last-name>Master</last-name><first-name>Script</first-name><middle-name></middle-name></event-author>
        <release-notes-version>AA</release-notes-version>
        <event-assigned-to>
            <assigned-to-user><last-name>Chang</last-name><first-name>Gilbert</first-name><middle-name></middle-name></assigned-to-user>
        </event-assigned-to>
    </defect-event>
    <defect-event>
        <event-name>Assign</event-name>
        <event-date>12/4/2009</event-date>
        <event-author><last-name>Chang</last-name><first-name>Gilbert</first-name><middle-name></middle-name></event-author>
        <release-notes-version>AA</release-notes-version>
        <event-assigned-to>
```

```xml
            <assigned-to-user><last-name>Millsaps</last-name><first-name>Chris</first-name><middle-name></middle-name></assigned-to-user>
        </event-assigned-to>
    </defect-event>
    <defect-event>
        <event-name>Assign</event-name>
        <event-date>12/4/2009</event-date>
        <event-author><last-name>Millsaps</last-name><first-name>Chris</first-name><middle-name></middle-name></event-author>
        <notes>This test fails because of the gen 3 equalization convergence changes. In a real system it is not an issue because the upstream port will be in hot reset state for a minimum of 2ms. In this test the upstream port is in hot reset for 9.3us. To make the dut return to its former behavior, force tx_adapt_disable to 1 in phy_top.</notes>
        <release-notes-version>AA</release-notes-version>
        <event-assigned-to>
            <assigned-to-user><last-name>Chang</last-name><first-name>Gilbert</first-name><middle-name></middle-name></assigned-to-user>
        </event-assigned-to>
    </defect-event>
    <defect-event>
        <event-name>Assign</event-name>
        <event-date>12/4/2009</event-date>
        <event-author><last-name>Chang</last-name><first-name>Gilbert</first-name><middle-name></middle-name></event-author>
        <notes>Mani,
This is the case where upstream is in any other speed other than Gen 3 where it initiate Hot Reset. Any downstream port who is in Gen 3 could remain in Rec.Eq for way over 2 ms. Now, when upstream reaches 2ms and comes back to L0, sometime later when the downstream port finished Eq to Gen 3 L0, it will get the Hot Reset Propagate signal and initiate a Lev 1 reset to the upstream port which will caused Upstream port to go from L0 directly to Detect state.</notes>
        <release-notes-version>AA</release-notes-version>
        <event-assigned-to>
            <assigned-to-user><last-name>Balasubramaniyan</last-name><first-name>Nagamanivel</first-name><middle-name></middle-name></assigned-to-user>
        </event-assigned-to>
    </defect-event>
    <defect-event>
        <event-name>Assign</event-name>
        <event-date>12/9/2009</event-date>
        <event-author><last-name>Balasubramaniyan</last-name><first-name>Nagamanivel</first-name><middle-name></middle-name></event-author>
        <notes>Vikram
Please mark this as RFE for Draco-2. Here is the description about the issue.
Upstream port (Port0) goes from L0 à Recovery à Hot-reset after it receives TS1 with hot-reset sequence
Upstream port LTSSM asserts pl_link_reset to indicate received hot-reset sequence. This informs the reset module that upstream received hot-reset.
Reset module asserts stn_propgt_hot_rst signal to downstream ports and downstream port start propagating hot-reset if it is not busy. Port9 was busy with equalization and didn't propagate hot-reset until it completes the equalization.
Once Port9 completes the hot-reset propagation, Port9 PHY asserts pl_done_propgt_hot_rst interface to reset module.
Reset module asserts level01 reset.
PHY brings down the upstream LTSSM from L0 to Detect state when it sees level01 assertion.
Reset module doesn't have timer to bypass the pl_done_propgt_hot_rst signal. It simply waits for this signal assertion, but PHY upstream LTSSM doesn't wait for the downstream port hot-reset propagation done indication.
This is the real issue.</notes>
        <release-notes-version>AA</release-notes-version>
        <event-assigned-to>
            <assigned-to-user><last-name>Sharma</last-name><first-name>Vikram</first-name><middle-name></middle-name></assigned-to-user>
        </event-assigned-to>
    </defect-event>
    <defect-event>
        <event-name>Make RFE</event-name>
        <event-date>12/11/2009</event-date>
        <event-author><last-name>Sharma</last-name><first-name>Vikram</first-name><middle-name></middle-name></event-author>
        <notes>Made RFE for Draco2.</notes>
        <event-assigned-to>
            <assigned-to-user><last-name>Sharma</last-name><first-name>Vikram</first-name><middle-name></middle-name></assigned-to-user>
        </event-assigned-to>
        <custom-field-value field-name="Recommendation">
            <multi-line-text>Made RFE for Draco2.</multi-line-text>
        </custom-field-value>
        <custom-field-value field-name="Impact to not implement">
```

-continued

```
        <multi-line-text>Made RFE for Draco2.</multi-line-text>
    </custom-field-value>
    <custom-field-value field-name="Reason for Change">
        <multi-line-text>Made RFE for Draco2.</multi-line-text>
    </custom-field-value>
    <custom-field-value field-name="RFE Description">
        <multi-line-text>Made RFE for Draco2. If a downstream port does not
respond to hot reset for more than 2 milliseconds, the upstream can get a surprise down
later.</multi-line-text>
    </custom-field-value>
</defect-event>
<defect-status>RFE</defect-status>
<created-by><last-name>Master</last-name><first-name>Script</first-name><middle-name></middle-name></created-by>
    <date-created>12/4/2009 4:07 PM</date-created>
    <creation-method>XML file import</creation-method>
    <last-modified-by><last-name>Sharma</last-name><first-name>Vikram</first-name><middle-name></middle-name></last-modified-by>
    <date-last-modified>12/11/2009 6:03 PM</date-last-modified>        <historical-
event date="12/4/2009 7:19 PM" last-name="Chang" information="Changed the following
fields: Disposition, Component"/>
    <historical-event date="12/4/2009 7:19 PM" last-name="Chang"
information="Changed reported by record (Auto Defect - ) fields:Description, Steps to
Reproduce"/>
    <historical-event date="12/4/2009 7:19 PM" last-name="Chang"
information="Added Assign event (Gilbert Chang - 12/4/2009)"/>
    <historical-event date="12/4/2009 7:42 PM" last-name="Millsaps"
information="Added Assign event (Chris Millsaps - 12/4/2009)"/>
    <historical-event date="12/4/2009 10:33 PM" last-name="Chang"
information="Added Assign event (Gilbert Chang - 12/4/2009)"/>
    <historical-event date="12/5/2009 8:55 PM" last-name="Balasubramaniyan"
information="Changed the following fields: Disposition, Reference"/>
    <historical-event date="12/9/2009 1:26 AM" last-name="Silver"
information="Changed the following fields: Disposition"/>
    <historical-event date="12/10/2009 1:28 AM" last-name="Balasubramaniyan"
information="Changed the following fields: Summary, Reference"/>
    <historical-event date="12/10/2009 1:28 AM" last-name="Balasubramaniyan"
information="Added Assign event (Nagamanivel Balasubramaniyan - 12/9/2009)"/>
    <historical-event date="12/11/2009 6:01 PM" last-name="Sharma"
information="Changed the following fields: Summary"/>
    <historical-event date="12/11/2009 6:03 PM" last-name="Sharma"
information="Added Make RFE event (Vikram Sharma - 12/11/2009)"/>
</defect>
```

EXAMPLE 2

```
2759 091204 PL___: Reached timeout of ___ cycles and DUT should send a SKIP OS by
now
cd draco/vcore/regress; run_make -f ../../vcore/code/draco_vcore.vlist
../../vcore/test/test_program.vr +testcase=t_direct_hotreset -config
../../vcore/config/zero_tolerance.cfg -port_configuration random -phy_broken_lane 0 -
pmt_enable 0 -time_limit 120000 -switch_mode 2 -owner gilbert -note_off . -seed
1125376505
2759 091206 PL___: Reached timeout of ___ cycles and DUT should send a SKIP OS by
now
cd draco/vcore/regress; run_make -f ../../vcore/code/draco_vcore.vlist
../../vcore/test/test_program.vr +testcase=t_direct_no_eios_link_disable -config
../../vcore/config/zero_tolerance.cfg -port_configuration random -phy_broken_lane 0 -
pmt_enable 0 -time_limit 120000 -owner gilbert -note_off . -seed 1316700478
4300 091207 .PHY_PCS___: PCS: Stn ___ Elastic Buffer overflow
cd draco/chip/regress; run_make -f ../../chip/code/draco_chip.vlist
../../vcore/test/test_program.vr +testcase=t_eep_load_x224h_type1_ei_infer -config
../../vcore/config/zero_tolerance.cfg -config ../../vcore/config/eep.cfg -eeprm_enable 1 -
port_configuration random -eeprom_data_file x224.dat
+eeprom_bfm=EEPRM_2BYTE_40MHZ_MODEL -pmt_enable 1 -dut_aspm_l1_enable 0 -
bfm_aspm_l1_enable 0 -dut_aspm_enable 0 -bfm_aspm_enable 0 -cleanout_limit 200000 -
owner gilbert_chip -note_off . -seed 1635405197
4462 091220 PL___: DUT already send ___ TS, DUT should send EIEOS after ___ TS's,
cd draco/chip/regress; run_make -f ../../chip/code/draco_chip.vlist
../../vcore/test/test_program.vr +testcase=t_l1pm_nopac -config
../../vcore/config/zero_tolerance.cfg -port_configuration random -packet_limit 5 -pmt_enable
1 -dut_aspm_l1_enable 0 -bfm_aspm_l1_enable 0 -dut_aspm_enable 0 -bfm_aspm_enable 0
-inferred_eidle_speed_change_from_L1 1 -all_gen2_support 1 -cleanout_limit 200000 -
owner alexz -owner gilbert_chip -note_off . -seed 764038562
```

-continued

```
2759 091222 PL___: Reached timeout of ___ cycles and DUT should send a SKIP OS by
now
cd draco/vcore/regress; run_make -f ../../vcore/code/draco_vcore.vlist
../../vcore/test/test_program.vr +testcase=t_direct_link_disable -config
../../vcore/config/zero_tolerance.cfg -port_configuration random -time_limit 120000 -
dead_time_limit 400000 -switch_mode 2 -owner gilbert -note_off . -seed 1316671558
4462 100213 PL___: DUT already send ___ TS, DUT should send EIEOS after ___ TS's,
cd draco/chip/regress; run_make -f ../../chip/code/draco_chip.vlist
../../vcore/test/test_program.vr +testcase=t_l1pm_nopac -config
../../vcore/config/zero_tolerance.cfg -port_configuration random -packet_limit 5 -pmt_enable
1 -dut_aspm_l1_enable 0 -bfm_aspm_l1_enable 0 -dut_aspm_enable 0 -bfm_aspm_enable 0
-inferred_eidle_speed_change_from_L1 1 -all_gen2_support 1 -cleanout_limit 200000 -
owner alexz -owner gilbert_chip -note_off . -seed 678717573
4462 100214 PL___: DUT already send ___ TS, DUT should send EIEOS after ___ TS's,
cd draco/chip/regress; run_make -f ../../chip/code/draco_chip.vlist
../../vcore/test/test_program.vr +testcase=t_l1pm_nopac -config
../../vcore/config/zero_tolerance.cfg -port_configuration random -packet_limit 5 -pmt_enable
1 -dut_aspm_l1_enable 0 -bfm_aspm_l1_enable 0 -dut_aspm_enable 0 -bfm_aspm_enable 0
-inferred_eidle_speed_change_from_L1 1 -all_gen2_support 1 -cleanout_limit 200000 -
owner alexz -owner gilbert_chip -note_off . -seed 1673584465
4462 100215 PL___: DUT already send ___ TS, DUT should send EIEOS after ___ TS's,
cd draco/chip/regress; run_make -f ../../chip/code/draco_chip.vlist
../../vcore/test/test_program.vr +testcase=t_default -config
../../vcore/config/zero_tolerance.cfg -port_configuration random -time_limit 100000 -
cleanout_limit 1500000 -pmt_enable 0 -rand_speed_change_enable 1 -owner gilbert_chip -
note_off . -seed 760077418
```

What is claimed is:

1. A method for performing regression testing on a simulated hardware, the method comprising:
scanning a defect database for fixed signatures;
retrieving all tests in a failing instance database that correspond to the fixed signatures from the defect database;
running one or more of the retrieved tests;
determining if any of the retrieved tests failed during running; and
for any retrieved test that failed during running, refiling the failed retrieved tests in the failing instance database and placing one or more generalized signatures for the failed retrieved tests in the defect database.

2. The method of claim 1, wherein the defect database and the failing instance database are stored in the same physical database.

3. The method of claim 1, wherein the method is performed at periodic intervals.

4. The method of claim 1, wherein the method is performed dynamically as signatures are indicated as fixed.

5. The method of claim 1, wherein at least one entry in the failing instance database includes a seed value.

6. The method of claim 5, wherein if an entry corresponding to a retrieved test from the failing instance database contains a seed value, then the running one or more of the retrieved tests includes running the retrieved test corresponding to the entry containing a seed value using all seed values within a certain threshold value of the seed value identified in the entry.

7. The method of claim 1, wherein at least one entry in the failing instance database includes an address.

8. The method of claim 7, wherein if an entry corresponding to the retrieved test from the failing instance database contains an address, then the running one or more of the retrieved tests includes running the retrieved test corresponding to the entry containing an address using all addresses within a certain threshold value of the address identified in the entry.

9. The method of claim 1, wherein the running one or more of the retrieved tests includes running all of the retrieved tests.

10. A regression test suite including:
a processor;
a memory storing a defect database containing generalized signatures of failed tests;
a failing instance database containing an entry for each unique failed test;
a defect database scanner coupled to the defect database and configured to scan the defect database for fixed signatures;
a failing instance runner coupled to the defect database scanner and to the failing instance database and configured to retrieve all tests in the failing instance database that correspond to the fixed signatures from the defect database, and run one or more of the retrieved tests; and
a failed test refiler coupled to the failing instance runner, the defect database, and the failing instance database and configured to determine if any of the retrieved tests failed during running, and, for any retrieved test that failed during running, refile the failed retrieved tests in the failing instance database and place one or more generalized signatures for the failed retrieved tests in the defect database.

11. The regression test suite of claim 10, wherein the regression test suite operates to test a simulation of an integrated circuit.

12. The regression test suite of claim 11, wherein a user operates the regression test suite after making a fix to the simulation of the integrated circuit.

13. A hardware apparatus for performing regression testing on a simulated hardware, the apparatus comprising:
means for scanning a defect database for fixed signatures;
means for retrieving all tests in a failing instance database that correspond to the fixed signatures from the defect database;
means for running one or more of the retrieved tests;
means for determining if any of the retrieved tests failed during running; and
means for, for any retrieved test that failed during running, refiling the failed retrieved tests in the failing instance database and placing one or more generalized signatures for the failed retrieved tests in the defect database.

14. The apparatus of claim 13, wherein at least one entry in the failing instance database includes a seed value.

15. The apparatus of claim 14, wherein if an entry corresponding to a retrieved test from the failing instance database contains a seed value, then the means for running one or more of the retrieved tests includes means for running the retrieved test corresponding to the entry containing a seed value using all seed values within a certain threshold value of the seed value identified in the entry.

16. The apparatus of claim 13, wherein at least one entry in the failing instance database includes an address.

17. The apparatus of claim 16, wherein if an entry corresponding to the retrieved test from the failing instance database contains an address, then the means for running one or more of the retrieved tests includes means for running the retrieved test corresponding to the entry containing an address using all addresses within a certain threshold value of the address identified in the entry.

18. The apparatus of claim 13, wherein the running one or more of the retrieved tests includes running all of the retrieved tests.

19. A non-transitory program storage device readable by a machine tangibly embodying a program of instructions executable by the machine to perform a method for performing regression testing on a simulated hardware, the method comprising:
    scanning a defect database for fixed signatures;
    retrieving all tests in a failing instance database that correspond to the fixed signatures from the defect database;
    running one or more of the retrieved tests;
    determining if any of the retrieved tests failed during running; and
    for any retrieved test that failed during running, refiling the failed retrieved tests in the failing instance database and placing one or more generalized signatures for the failed retrieved tests in the defect database.

* * * * *